Dec. 20, 1960  W. S. EDSALL  2,965,809
MOTOR STARTERS
Filed May 21, 1956  3 Sheets-Sheet 3
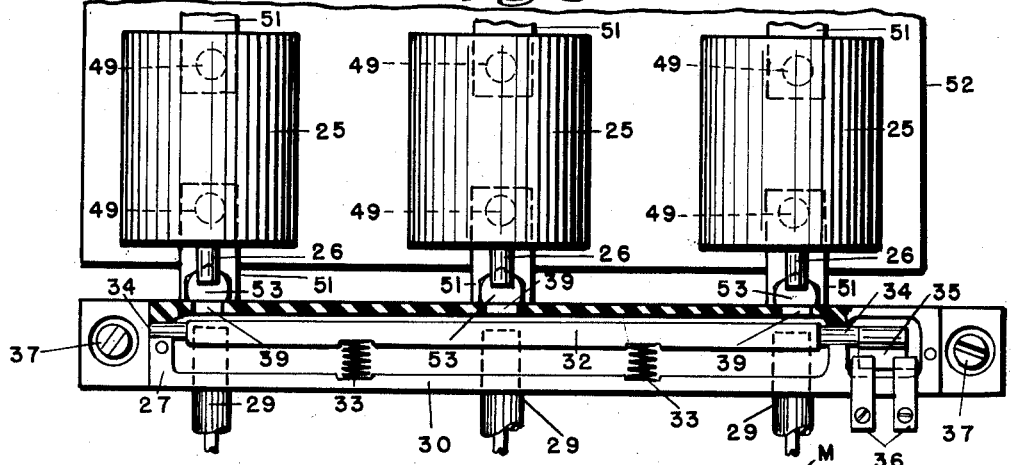
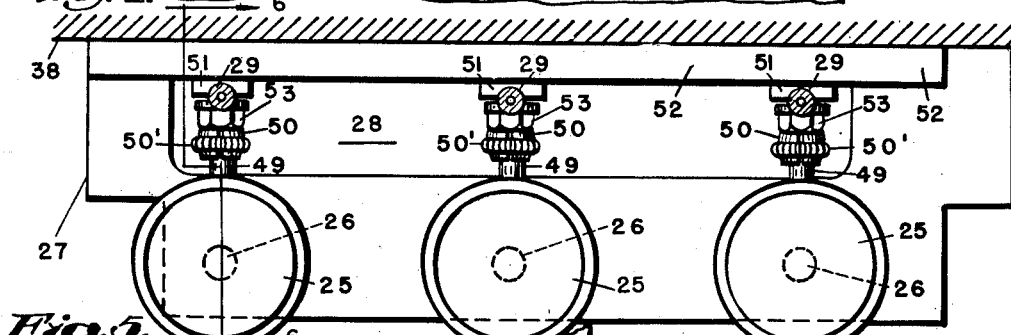
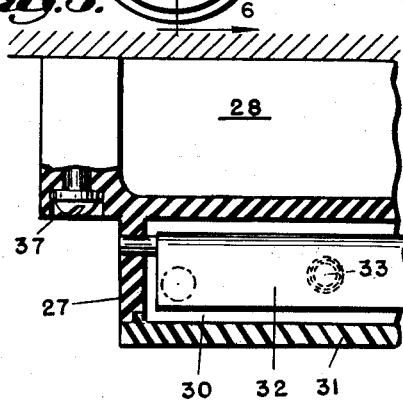
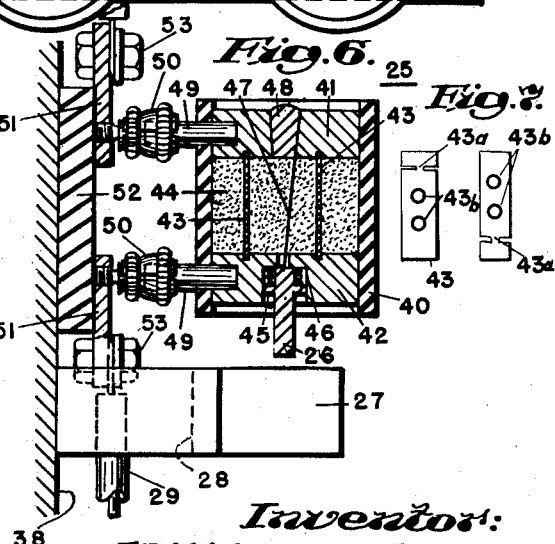
Inventor:
William S. Edsall,
by [signature] Attorney

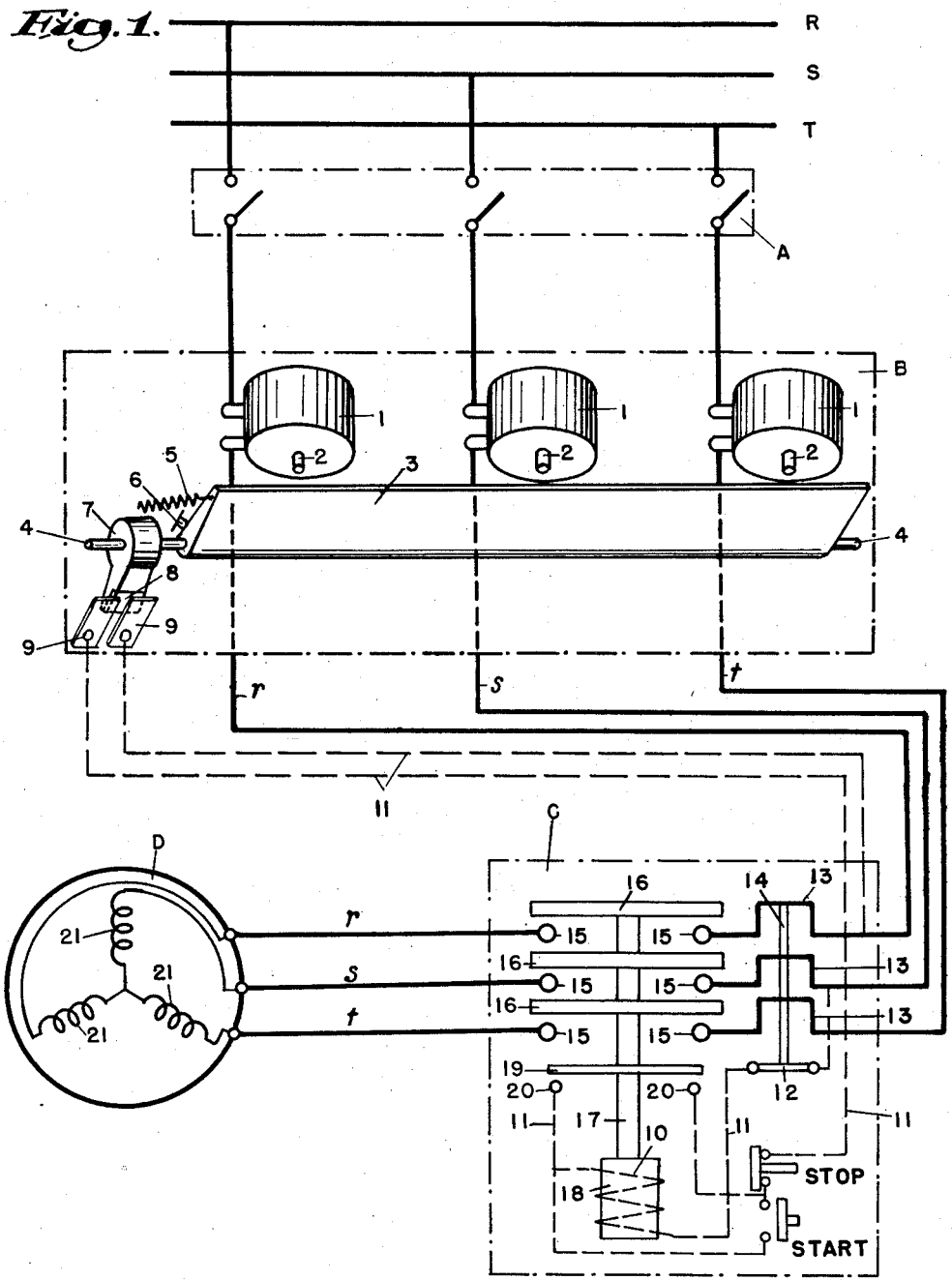

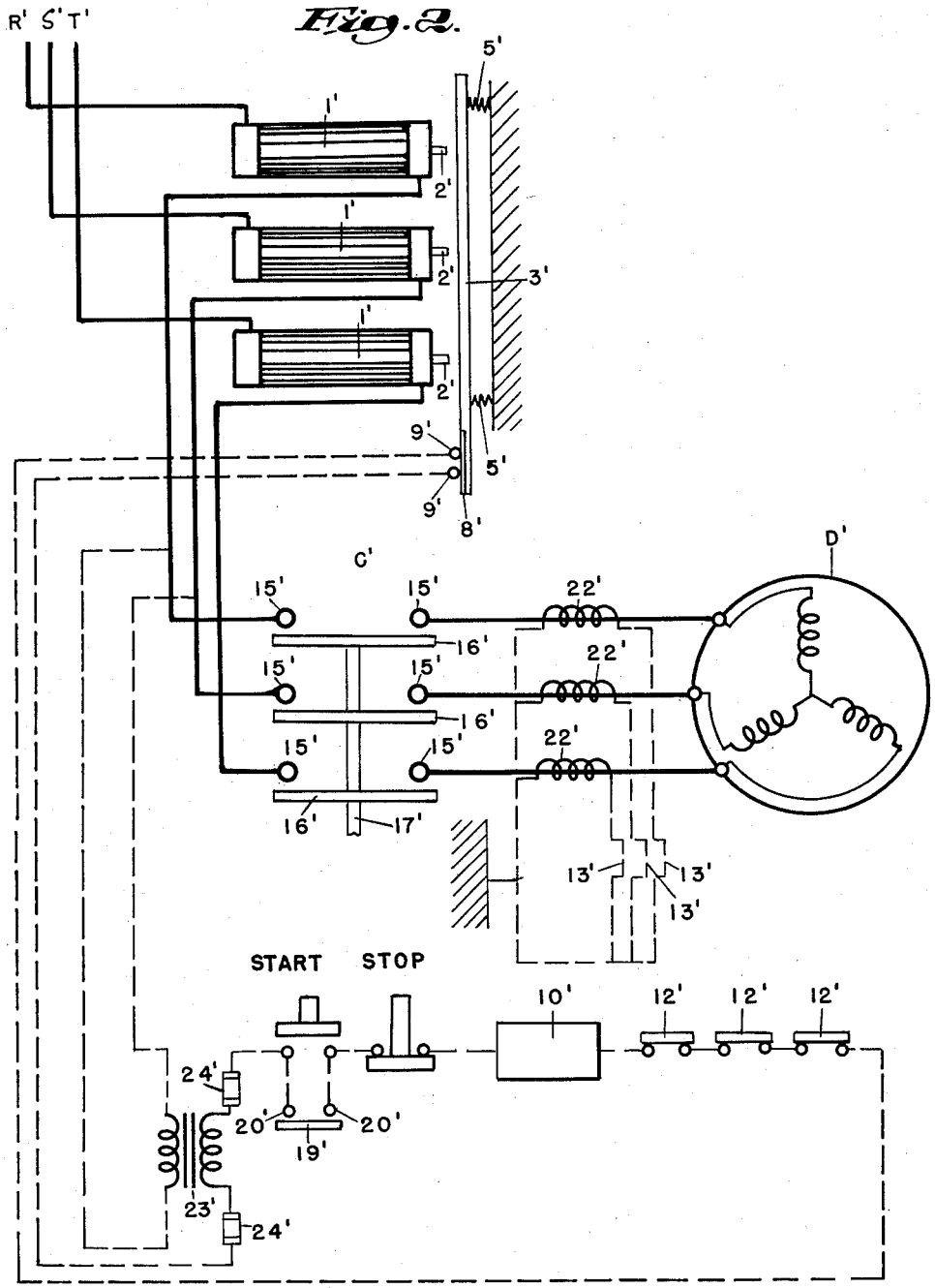

United States Patent Office

2,965,809
Patented Dec. 20, 1960

2,965,809

MOTOR STARTERS

William S. Edsall, Boston, Mass., assignor to The Chase-Shawmut Company, Newburyport, Mass.

Filed May 21, 1956, Ser. No. 586,003

7 Claims. (Cl. 317—46)

This invention relates to magnetic motor starters, and more particularly to means associated with such motor starters for precluding single-phasing of three-phase motors.

Where one of the three phases of a circuit supplying a three-phase motor is being interrupted, a pulsating magnetic field takes the place of the rotating stator field normally occurring in such motors. The motor then operates in the fashion of a single-phase transformer whose secondary winding is short-circuited. Where one phase is interrupted, the three-phase motor is no longer able to start. Where the three-phase motor is running while interruption of one phase occurs, a current is being induced in the rotor by the stator flux. The rotating flux resulting from the rotor flux and the stator flux tends to keep the motor running. Under such conditions the two sound lines of the supply circuit pass more than the normal three-phase current and the rotor current also increases above normal. Thus the motor is likely to overheat if fully loaded.

It is, therefore, one object of this invention to preclude overheating of three-phase motors due to single-phasing.

The general approach to protection against single-phasing depends upon whether the particular motor is wye connected or delta connected. Where the stator of a three-phase motor is wye connected, the increased current through the two connected phase windings will be equal to the current in the two intact supply lines. Therefore, in the particular instance, protection against single-phasing can be achieved, and is being achieved in conventional motor starters, by the overload relays provided in the supply lines. Where the stator of a three-phase motor is delta connected, the overload relays normally provided in the supply lines do not provide effective protection against single-phasing. Hence it may be necessary or desirable in that instance to provide additional relay means responsive upon occurrence of a predetermined unbalance between the currents in the three supply lines.

Magnetic motor starters have generally a relatively small interrupting capacity, about ten times the full load motor current. It is, therefore, desirable to arrange current-limiting fuses in series with motor starters to protect motor starters against the dangerous electromagnetic and thermal effects of major fault currents. The object of current-limiting fuses is, as their name implies, to limit the peak of the current which is let through them—the so called let-through current—well below the peak of the fault current available at the point of the circuit where the current-limiting fuse is located. While combinations of magnetic motor starters and of current-limiting fuses are capable of providing effective protection of the former against the dangers inherent in major fault currents and have, in the past, served that purpose well, provision of magnetic motor starters with current-limiting back-up fuses establishes a situation regarding protection of three-phase motors against single-phasing different from that encountered in magnetic starters without back-up protection by current-limiting fuses.

It is another object of this invention to provide combinations of magnetic motor starters and of current-limiting back-up fuses for the starters with protective means precluding single-phasing when but one of the three current-limiting fuses in the three supply lines of the motor blows.

Upon blowing of but one of these fuses the motor will tend to overheat. If the motor is wye connected the thermal overload relays in the supply lines will become operative before the motor can reach a dangerous excess temperature. On account of this fact it is common or generally accepted practice to connect current-limiting fuses in series with conventional magnetic motor starters without making any change or changes in the set-up of the starter. If the motor is delta connected, protection against dangerous overheating due to single-phasing may be achieved either by the normal overload relays in the supply lines, or by the aforementioned additional unbalance relays responsive upon occurrence of a predetermined difference between the currents in the three phases.

Whatever the particular means against single-phasing may be, the operation of such means is generally conditioned upon a rise in temperature caused by the flow of an excess current during predetermined periods of time. As a result, the temperature of the protective means is raised to the operating point thereof and the temperature of the motor is raised to an intermediate temperature below its danger temperature, but well above its normal operating temperature. It takes generally a substantial period of time for an overload relay with its substantial mass and heat absorbing capacity to cool down from its critical temperature of response to the temperature required for reclosing a magnetic motor starter. Such prolonged interruptions of service are highly undesirable. Provision of unbalance relays is always a complication and since such relays operate generally if a 25 percent phase unbalance prevails during a predetermined period of time, each single phase fault interruption by the current-limiting back-up fuses of the motor starter must be followed by a relatively long single-phasing period before the unbalance relays become operative. During this period of time the operation of the motor is unsatisfactory and the motor is heated above normal. Though the temperature of the motor remains well below the danger temperature, single-phasing, even during the limited period of time required for the response of unbalance relays, is undesirable.

It is, therefore, another object of the invention to provide combinations of multipolar magnetic motor starters and of current-limiting back-up fuses therefor with protective means causing instantaneous deenergization of the holding coil of the starter upon blowing of any of the back-up fuses, i.e. faster deenergization than that which is being achieved in prior art multipolar motor starters by the overload relays or by the unbalance relays thereof.

Magnetic prior art motor starters, particularly those having only relays of the time-lag type, allow fault currents of relatively small magnitude, e.g. fault current in the order of about eight times the rated current of the motor, to flow for a considerable period of time before their relay means become operative to interrupt the circuit of the holding coil of the starter. Fault currents of such a magnitude may be due to insulation defects which, initially, may be of but small consequence, but which may develop into major faults at the time the overload relays of the starter become operative to deenergize the holding coil.

It is, therefore, another object of the invention to provide multi-polar magnetic motor starters with back-up fuses subject to rapid blowing on the occurrence of relatively small fault currents, such as caused by insulation defects, and being in the order of about eight times the rated current of the motor, with means instantly operative upon blowing of any of the back-up fuses to interrupt the circuit of the holding coil.

It is also an object of the invention to generally improve multipolar magnetic across-the-line motor starter circuits and more particularly circuits comprising Y-connected three-phase motors.

Magnetic motor starters for three-phase circuits are generally supplied with two overload relays, one in each of two phases, no overload relay being applied in the third phase. In case of balanced overload conditions, all three phases carry currents of the same magnitude. Hence, under such conditions, but one single overload relay would be needed to protect the motor. In case of an open phase, the two remaining lines supply the motor with a current substantially in excess of the rated current. Irrespective which of the three phases should be interrupted, two overload relays provide generally sufficient overload protection, since at least one of two such relays would still be in the circuit to cause opening of the starter. It can be shown, however, that where a three-phase motor is supplied from a transformer connected in "wye-delta" or "delta-wye," adequate overload protection calls for magnetic motor starters with one overload relay in each of the three phases. This invention is equally applicable to magnetic motor starters having a thermal relay in each of the phases as to motor starters having a number of overload relays smaller than the number of phases.

For a better understanding of the invention reference may be had to the accompanying drawing in which:

Fig. 1 shows diagrammatically the arrangement of a three-phase magnetic across-the-line motor starter for a low voltage motor;

Fig. 2 shows diagrammatically the arrangement of a three phase magnetic across-the-line motor starter for a high voltage motor;

Fig. 3 is in part a front elevation of, and in part a vertical section through, a fuse holder for current-limiting fuses and parts associated therewith;

Fig. 4 is a top-plan view of the structure of Fig. 3;

Fig. 5 is in part a top plan view of, and in part a horizontal section through, switching means for interrupting the circuit of the holding coil of a motor starter;

Fig. 6 is a section along 6—6 of Fig. 4, and

Fig, 7 is a side elevation of the fuse links forming an integral part of the current-limiting fuses shown in Figs. 3, 4 and 6.

Referring now to the drawings, and more particularly to Fig. 1 thereof, reference character A has been applied to indicate a manual disconnect switch unit, reference character B has been applied to indicate a multipolar striker pin back-up fuse unit combined with an auxiliary switch unit, reference character C has been applied to indicate a magnetic across-the-line motor starter unit and reference character D has been applied to indicate a Y connected three-phase motor, e.g. a squirrel cage type motor. Switch unit A permits to connect the bus R, S, T to three current-limiting fuses 1 of the striker pin type whose construction is more clearly shown in Fig. 6. Each current-limiting fuse 1 comprises a striker pin 2 adapted to be ejected outwardly and downwardly upon blowing of the respective fuse 1. Cross-member 3 is arranged immediately below fuses 1 and transversely across the striker pins 2. Cross-member 3 is preferably made of insulating material and supported by a pair of pivots 4,4. Spring 5 biases cross-member 3 against the dog or abutment 6. The left pin 4 supports an arm 7 of insulating material provided with a movable contact 8. Contact 8 interconnects normally conductively the two fixed contacts 9 arranged in the circuit of the holding coil 10 of the motor starter C. The latter circuit has been indicated by dashed lines to which reference numerals 11 have been applied. In addition to the auxiliary switch made up of parts 7, 8, 9, the circuit of holding coil 10 comprises the auxiliary switch 12. Reference numerals 13 have been applied to indicate three inverse current-time type thermal overload relays arranged in the lines r, s, t interconnecting the current-limiting fuses 1 and the electric motor D. Each of the three relays 13 which may be formed, for instance, by directly or indirectly heated bimetallic elements, is adapted to operate switch 12 by the intermediary of member 14. The motor starter unit C further comprises fixed main contacts 15 of which one pair is arranged in each of the lines r, s, t and of which each is adapted to be bridged by one of the movable bridge contacts 16. Contacts 16 are operated by a rod 17 attached to core 18 under the action of holding coil 10. Contact bridge 19 also supported by rod 17 cooperates with contacts 20 to maintain the circuit of coil 10 closed after initial closing thereof by depressing the push button "Start." Push button "Stop" is intended to manually open the circuit of coil 10. Reference numerals 21 have been applied to indicate the Y connected stator windings of motor D. The current-limiting fuses 1 are coordinated with relays 13 to remain inoperative below a predetermined current intensity.

The operation of the above described arrangement is as follows: Upon blowing of any of the three current-limiting fuses 1 the striker pin 2 thereof is forcefully projected against the movable operating member 3, causing rocking thereof against the bias of spring 5 away from abutment 6. This causes separation of contact 8 from contacts 9 and consequent deenergization of coil 10. Blowing of any of the three fuses 1 results in single-phasing of motor D, yet motor D is subjected to little, i.e. virtually no excess heating because the auxiliary switch formed by parts 7, 8, 9 opens the circuit of coil 10 instantly and hence the period of time during which single-phasing conditions are allowed to prevail is insignificant. Switch 7, 8, 9 interrupts the circuit of coil 10 before any of the inverse time-current overload relays 13 can become operative to interrupt the circuit of coil 10.

Referring now to Fig. 2, the three high voltage fuses 1' are arranged in the three high voltage lines R, S, T. Each fuse 1' is provided with a striker pin 2 adapted to cooperate with the movable operating member 3' arranged transversely with respect to striker pins 2 to be moved in response to blowing of any of the three fuses 1. Member 3' is under the action of two springs 5' biasing the same from right to left, thereby causing contact 8' to engage the two fixed contacts 9'. Motor D' is adapted to be connected to the supply circuit by means of the across-the-line magnetic motor starter generally designated by reference character C'. Starter C' comprises fixed contacts 15' adapted to be conductively interconnected by movable bridge contacts 16' supported by rod 17' under the action of holding coil 10'. The circuit of motor D' comprises three current transformers 22' each supplying one of the three thermal inverse current-time type overcurrent relays 13'. The energizing circuit of holding coil 10 comprises three serially connected auxiliary switches 12' of which each is adapted to be opened by one of the relays 13'. The circuit of holding coil 10 is energized by a step-down transformer 23' and comprises two fuses 24'. "Start" and "Stop" push buttons, and the switch 19', 20' which is under the action of holding coil 10' to open and to close simultaneously with contacts 15', 16'.

The operation of the arrangement shown in Fig. 2 is substantially the same as that described in connection with Fig. 1. Upon blowing of anyone of the three current-limiting back-up fuses 1' for motor starter C' the respective striker pin 2' is projected from left to right, hitting operating member 3' and consequently separating contact 8' from contacts 9'. As a result, the circuit of holding coil 10 is opened at 8', 9' before any of relatively slow overload relays 13' and switches 12' can become operative to deenergize coil 10'.

Referring now to Figs. 3 to 7, inclusive, the structure shown therein includes a multipolar magnetic across-the-line motor starter which may be of any desired type, e.g. such as shown in Fig. 1. In Fig. 3 only the upper portion of the motor starter has been shown and indicated by the reference character M. The structure includes further three current-limiting back-up fuses 25 for the starter arranged in spaced relation therefrom. Each fuse 25 is povided with a striker pin device each having a striker pin 26 adapted to be projected outwardly in the direction of starter M upon blowing of the respective current-limiting fuse. The striker pin devices may either form an integral part of the current-limiting fuses 25, as clearly shown in Fig. 6, or be arranged separately from the fuses, i.e. in spaced relation therefrom. Insulating structure 27 extends transversely across striker pins 26 and defines a duct 28 situated at a relatively low level and adapted for the passage of wiring 29 and further defines an enclosure 30 situated at a relatively high level. Enclosure 30 may be closed by an insulating cover shown to have been removed in Fig. 3, and of which a portion 31 has been clearly shown in Fig. 5. Enclosure 30 houses the movable operating member 32 biased upwardly by helical springs 33. Operating member 32 is hingedly supported by pins 34 and provided with a movable contact 35 adapted to interconnect conductively the two stationary contacts 36. Screws 37 on the outer ends of insulating structure 27 enable to secure the structure to any vertical support, such as, for instance, panel 38. Structure 27 is provided with three openings 39 on the side thereof juxtaposed to striker pins 26. Openings 39 are sufficiently large to permit operating member 32 to be actuated by the striker pin 26 of each fuse 25 but sufficiently small to preclude manual tampering with operating member 32.

Referring now to Fig. 6, the fuse shown therein comprises an insulating casing 40 preferably made of a synthetic resin-glass-cloth laminate. Casing 40 is closed by copper plugs 41, 42 conductively interconnected by ribbon-type fuse links 43 of silver. Links 43 are surrounded by a pulverulent silicious arc-quenching medium 44, preferably chemically substantially pure quartz sand. Lower copper plug 42 has a recess 45 in which striker pin 26 is accommodated. Striker pin 26 is biased downwardly by a helical spring 46 and normally held in position by a fusible wire 47. The lower end of wire 47 is secured to the striker pin 26, while the upper end of wire 47 is held in position by a wedge block 48 inserted into a conform bore in the upper copper plug 41. Wire 47 normally maintains striker pin 26 in position against the action of spring 26, but releases the striker pin 26 upon fusion. The two ribbon-type fuse links 43 as well as the wire 47 interconnect conductively the two copper plugs 41, 42 and are adapted to be arranged in parallel in an electric circuit. Upon occurrence of a fault of relatively large magnitude links 43 and fusible wire 47 fuse sequentially, and fusion of the latter releases striker pin 26.

The insulating casing 40 and copper plugs 41, 42 are preferably pinned to each other by transverse steel pins (not shown). Pins 49 projecting transversely across casing 40 into each of copper plugs 41, 42 form contacts to connect current-limiting fuse 25 into the circuit. Pins 49 engage fixed tulip type contacts 50 including garter springs 50'. Contacts 50 are supported by terminal straps 51 mounted on a block 52 of insulating material, e.g. slate. Straps 51 are provided with terminal screws 53 by means of which the cables 29 are conductively connected to straps 51.

The fuse links 43 shown in Figs. 6 and 7 have a particular geometry more fully explained in United States Patent 2,653,203 to Frederick J. Kozacka, September 22, 1953, Current-Limiting Fuse. Each fuse link 43 has at least one restricted cross-section portion 43a which is very short and narrow and forms substantially a point heat source causing rapid blowing on occurrence of insulation faults in a serially connected motor as shown in Figs. 1 and 2. The proportions of the points of reduced cross-section or necks 43a are such that blowing of fuse 25 is rapidly initiated at necks 43a, at the occurrence of currents in the windings of a motor as low as more than five but less than ten times the rated current of the motor. By rapid blowing of the fuse an operation thereof is understood which involves pre-arcing times in the order of only several hundredth of a second in the aforementioned range of more than five but less than ten times the rated current of the motor. Fuse links 43 are perforated along the center lines thereof and these perforations define reduced cross-section portions 43b the cross-sectional area of which is larger than that of necks 43a and which fuse after necks 43a are fused.

The contacts 36 shown in Fig. 3 correspond to the contacts 9 of Fig. 1 and to the contacts 9' of Fig. 2. The structure shown in Fig. 3 is supposed to be supplemented either by the low voltage circuitry shown in Fig. 1 or by the high voltage circuitry shown in Fig. 2. All three current-limiting fuses 25 shown in Figs. 3, 4 and 6 are identical. Upon blowing of either of them the striker pin 26 thereof is projected through one of the apertures 39 and causes rocking of transverse member or bar 32 against the action of springs 33. As a result, member or bar 32 is caused to pivot and contact 35 is thus separated from contacts 36. Hence the energizing circuit of the holding coil (not shown in Fig. 3) forming an integral part of magnetic motor starter M is opened before any of the overload relays of the time-lag type of motor starter M becomes operative.

It will be understood that, although but a few embodiments of the invention have been shown and described in detail, the invention is not limited thereto and that the illustrated embodiments may be modified or other embodiments made without departing from the spirit and scope of the invention as set forth in the accompanying claims.

I claim as my invention:

1. In combination an electric three-phase power circuit, an electric motor comprising wye connected stator windings arranged in said power circuit, a magnetic across-the-line motor starter in said power circuit for starting said motor, said starter comprising a holding coil and at least two overload relays of the time-lag type arranged in said power circuit operative upon occurrence of an unbalance in said stator windings, a control circuit for energizing said holding coil, a first auxiliary switch in said control circuit under the control of said plurality of relays for interrupting said control circuit in response to operating conditions of said plurality of relays, a plurality of current-limiting fuses in said power circuit coordinated with said plurality of relays to remain inoperative below predetermined current intensities, a plurality of striker pin devices each associated with one of said plurality of fuses, each of said plurality of devices comprising a spring-biased striker pin and a pin-restraining wire adapted to fuse upon blowing of one of said plurality of fuses, a movable operating member arranged transversely with respect to said striker pin of each of said plurality of devices to be moved in response to blowing of one of said plurality of fuses, and a second auxiliary switch in said control circuit under the control of said member for interrupting said control circuit in response to blowing of any of said plurality of fuses before said relays become operative.

2. In combination a multipolar magnetic motor starter, a plurality of current-limiting fuses arranged in spaced relation from said starter, a plurality of striker pin devices each having a striker pin adapted to be projected outwardly in the direction of said starter upon blowing of one of said plurality of fuses, wiring extending between said starter and said plurality of fuses, an insulating structure arranged in the space between said starter and said plurality of fuses extending generally transversely across said plurality of striker pin devices, said structure defining a duct for the passage of said wiring and also defining a housing, a movable operating member inside said housing, opening means in the side of said housing juxtaposed to said striker pin devices to permit operation of said member by said striker pin devices, and a switch arranged inside said housing under the control of said member.

3. In combination a multipolar magnetic motor starter, a plurality of current-limiting fuses arranged in spaced relation from said starter, a plurality of striker pin devices each having a striker pin adapted to be projected outwardly upon blowing of one of said plurality of fuses, an insulating structure extending transversely across said plurality of striker pin devices, said insulating structure defining a duct for the passage of wiring situated at a relatively low level and further defining an enclosure situated at a relatively high level, a movable operating member inside of said enclosure, opening means in the side of said structure juxtaposed to said striker pin devices permitting operation of said member by said striker pin devices, and an electric switch inside said housing under the control of said member.

4. In combination a multipolar magnetic motor starter, a plurality of current-limiting fuses arranged in spaced relation from said starter, a plurality of striker pin devices each having a striker pin adapted to be projected outwardly upon blowing of one of said plurality of fuses, an insulating structure extending transversely across said plurality of striker pin devices, said insulating structure defining a duct situated at a relatively low level adapted for the passage of wiring and further defining an enclosure situated at a relatively high level, a movable operating member inside of said enclosure, opening means in the side of said structure juxtaposed to said striker pin of each of said plurality of striker pin devices, said opening means being sufficiently large to permit said operating member to be actuated by said striker pin of each plurality of striker pin devices but sufficiently small to preclude manual tampering with said operating member, and a switch arranged inside of said housing under the control of said operating member.

5. In combination an electric polyphase power circuit, an electric motor connected into said power circuit, a magnetic motor starter connected into said power circuit for starting said motor, said starter comprising a holding coil and a plurality of inverse-time overload responsive means arranged in said power circuit, a control circuit for energizing said holding coil, a first auxiliary switch in said control circuit under the control of said plurality of overload responsive means for interrupting said control circuit in response to operating conditions of said plurality of overload responsive means, a plurality of current-limiting fuses in said power circuit coordinated with said plurality of overload responsive means to remain inoperative below a predetermined current-intensity, each of said plurality of current-limiting fuses comprising fuse link means, a spring-biased striker pin, and a fusible pin-restraining wire shunting said fuse link means, a movable operating member arranged transversely with respect to the direction of the stroke of said striker pin of each of said plurality of current-limiting fuses to be moved in response to blowing of any of said plurality of current-limiting fuses, and a second auxiliary switch in said control circuit under the control of said member for interrupting said control circuit in response to blowing of any said plurality of current-limiting fuses.

6. In combination a multipolar magnetic motor starter including a holding coil, a control circuit for energizing said holding coil, a plurality of current-limiting fuses arranged in spaced relation from said motor starter each adapted to provide back-up protection for one pole of said motor starter, a plurality of striker pin devices each operatively related to one of said plurality of fuses and each having a striker pin adapted to be projected axially outwardly upon blowing of one of said plurality of fuses, shaft means extending generally transversely across said plurality of striker pin devices adapted to be operated by each of said plurality of striker pin devices in response to operation thereof, an auxiliary switch arranged in said control circuit operable by said shaft means to open said control circuit upon operation of said shaft means by any of said plurality of striker pin devices, a housing for said shaft means extending generally transversely across said plurality of striker pin devices segregating said shaft means from the constituent parts of said motor starter, and said housing having a plurality of openings each in alignment with the striker pin of one of said plurality of striker pin devices to allow said striker pin to operate said shaft means inside said housing.

7. In combination a multipolar magnetic motor starter including a holding coil, a control circuit for energizing said holding coil, a plurality of current-limiting fuses arranged in spaced relation from said motor starter each adapted to provide back-up protection for one pole of said motor starter, a plurality of striker pin devices each operatively related to one of said plurality of fuses and each having a striker pin adapted to be projected axially outwardly upon blowing of one of said plurality of fuses, shaft means extending generally transversely across said plurality of striker pin devices adapted to be operated by each of said plurality of striker pin devices in response to operation thereof, an auxiliary switch arranged in said control circuit operable by said shaft means to open said control circuit upon operation of said shaft means by any of said plurality of striker pin devices, a common housing for said shaft means and said auxiliary switch extending generally transversely across said plurality of striker pin devices segregating said shaft means and said auxiliary switch from the constituent parts of said motor starter, and said housing having a plurality of openings each in alignment with the striker pin of one of said plurality of striker pin devices and each having a diameter slightly larger than the diameter of said striker pin of each of said plurality of striker pin devices to allow said striker pin of each of said plurality of striker pin devices to move from the space outside said housing into the space inside said housing.

References Cited in the file of this patent

UNITED STATES PATENTS

| 1,192,974 | Anderson | Aug. 1, 1916 |
| 1,658,912 | Alder | Feb. 14, 1928 |
| 2,473,196 | Dannenberg | June 14, 1949 |
| 2,838,718 | Edmunds | June 10, 1958 |

OTHER REFERENCES

Electrical Review, November 22, 1946, pp. 821–823.
Electrical Review, December 13, 1946, pp. 974–976.